(12) United States Patent
Tazaki et al.

(10) Patent No.: US 10,892,689 B2
(45) Date of Patent: Jan. 12, 2021

(54) SWITCHING POWER SUPPLY DEVICE

(71) Applicant: Panasonic Intellectual Property Management Co., Ltd., Osaka (JP)

(72) Inventors: Shintaro Tazaki, Kanagawa (JP); Kento Mochizuki, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/660,457

(22) Filed: Oct. 22, 2019

(65) Prior Publication Data

US 2020/0052606 A1 Feb. 13, 2020

Related U.S. Application Data

(63) Continuation of application No. PCT/JP2018/047363, filed on Dec. 21, 2018.

(30) Foreign Application Priority Data

Dec. 22, 2017 (JP) ................................ 2017-246187

(51) Int. Cl.
*H02M 7/06* (2006.01)
*H02M 1/32* (2007.01)
(Continued)

(52) U.S. Cl.
CPC ............. *H02M 7/062* (2013.01); *H02M 1/32* (2013.01); *H02M 3/158* (2013.01); *H02M 7/1557* (2013.01)

(58) Field of Classification Search
CPC ...... H02M 7/062; H02M 7/1557; H02M 1/12; H02M 1/32; H02M 3/156–158; H02M 3/1584; H02M 3/1588
(Continued)

(56) References Cited

U.S. PATENT DOCUMENTS 2,899,566 A * 8/1959 Ware ..................... H02M 5/293
307/73
2,911,582 A * 11/1959 Kellogg .................. H01F 38/04
363/12
(Continued)

FOREIGN PATENT DOCUMENTS

JP 2017-169350 A 9/2017

*Primary Examiner* — Yemane Mehari
(74) *Attorney, Agent, or Firm* — Seed IP Law Group LLP (57) ABSTRACT

The switching power supply device is provided with: a plurality of power supply circuits corresponding to phases of a multi-phase AC power supply; a switching circuit that is capable of switching a phase connected to a power supply circuit not corresponding to one discretionary phase of the multi-phase AC power supply between the one discretionary phase and a phase to which the power supply circuit corresponds; an inrush current prevention circuit for preventing inrush current that is provided on a negative-electrode-side power supply line of the multi-phase AC power supply and at a position further toward the multi-phase AC power supply than is a connection point to which each of the plurality of power supply circuits are connected; and a filter circuit that is provided between the multi-phase AC power supply and the inrush current prevention circuit and has all lines of the plurality of phases magnetically coupled thereto.

7 Claims, 9 Drawing Sheets

(51) Int. Cl.
*H02M 3/158* (2006.01)
*H02M 7/155* (2006.01)

(58) Field of Classification Search
USPC .................................................. 323/276–282
See application file for complete search history.

(56) References Cited

U.S. PATENT DOCUMENTS

| | | | | |
|---|---|---|---|---|
| 2,953,736 | A * | 9/1960 | Kellogg | H01F 38/04 363/12 |
| 3,517,296 | A * | 6/1970 | Kuhn | H02J 7/1492 363/87 |
| 2008/0284367 | A1* | 11/2008 | Kawashima | H02M 1/126 318/700 |
| 2018/0115235 | A1* | 4/2018 | Ng | H02M 1/083 |
| 2019/0036462 | A1* | 1/2019 | Tazaki | H02M 1/32 |

* cited by examiner

SWITCHING POWER SUPPLY DEVICE

TECHNICAL FIELD

The present disclosure relates to a switched-mode power supply device.

BACKGROUND ART

Conventionally, power supply devices that convert alternating current power from a polyphase alternator into direct current power are known (e.g., see Patent Literature (hereinafter referred to as "PTL") 1).

CITATION LIST

Patent Literature

PTL 1
Japanese Patent Application Laid-Open No. 2017-169350

SUMMARY OF INVENTION

Technical Problem

In a configuration described in PTL 1, a switching relay and an inrush prevention relay are closer to the alternator than a power supply filter is. Accordingly, it is necessary to provide their relay-driving driver circuits with respective noise removal filters in addition to the power supply filter.

An object of the present disclosure is to provide a switched-mode power supply device in which noise removal filters for relay-driving driver circuits are dispensed with such that the device can be miniaturized.

Solution to Problem

One embodiment of the present disclosure is a switched-mode power supply device provided with a plurality of power supply circuits that correspond to phases of a polyphase alternator, the switched-mode power supply device including: a switching circuit that allows switching of a phase connected to one of the plurality of power supply circuits not corresponding to a certain phase of the polyphase alternator, the switching being done between the certain phase and a phase to which the power supply circuit corresponds; an inrush current prevention circuit that is disposed on a power supply line on a negative electrode side of the polyphase alternator and is disposed at a position closer to the polyphase alternator than a connection point at which the plurality of power supply circuits are connected is to the polyphase alternator, the inrush current prevention circuit being configured to prevent an inrush current; and a filter circuit disposed at a position closer to the polyphase alternator than the switching circuit and the inrush current prevention circuit are to the polyphase alternator, the filter circuit being a circuit in which all lines for the phases are magnetically coupled to one another.

Advantageous Effects of Invention

According to the present disclosure, it is possible to provide the switched-mode power supply device in which the noise removal filters for the relay-driving driver circuits are dispensed with such that the device can be miniaturized.

DESCRIPTION OF EMBODIMENTS

Hereinafter, a switched-mode power supply device according to an embodiment of the present disclosure will be described in detail with reference to the attached drawings. Note that, the embodiment described below is one example and the present disclosure is not limited by this embodiment.

Embodiment 1

Figure 1:
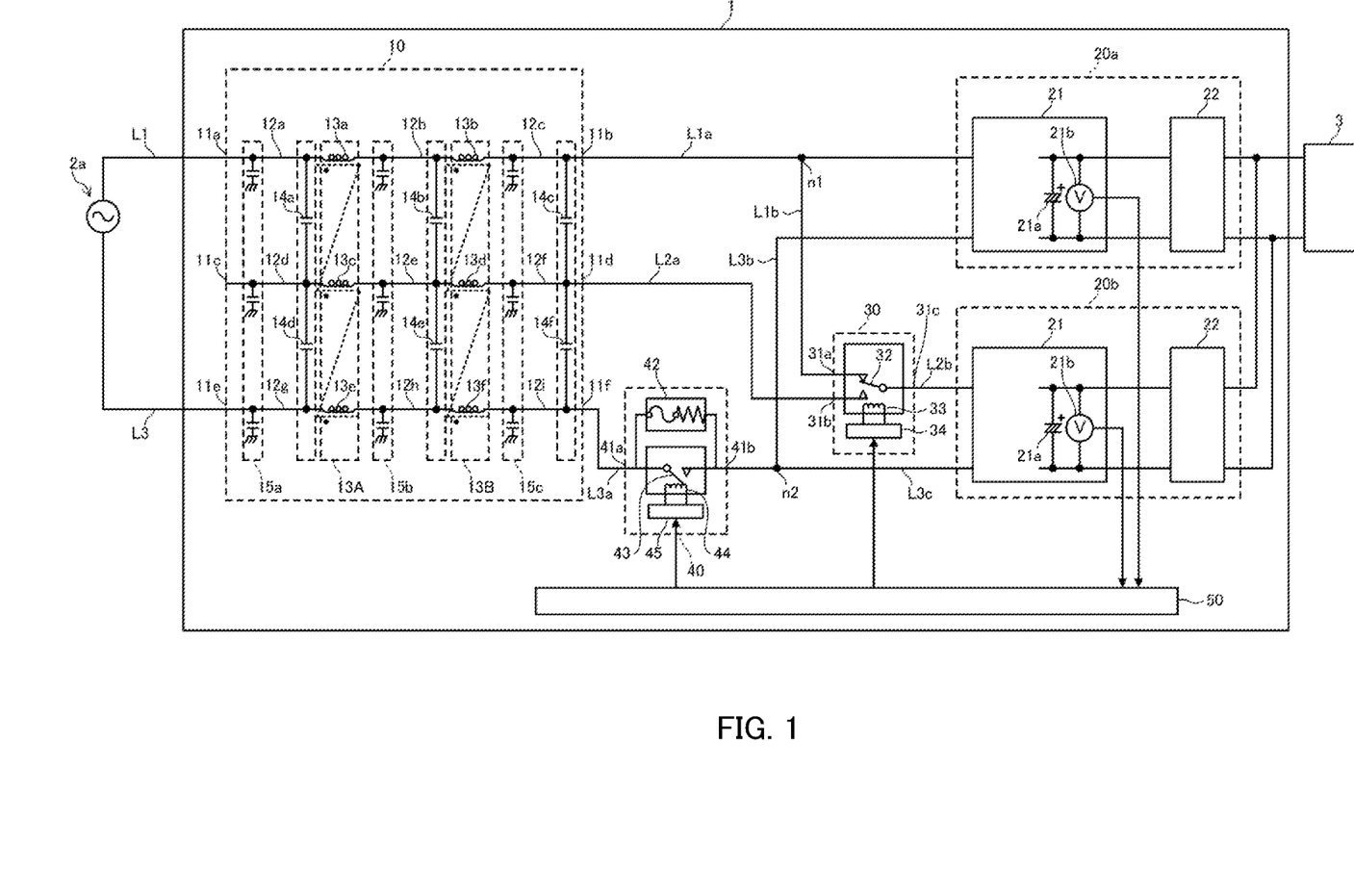
FIG. 1 is a block diagram illustrating a switched-mode power supply device according to Embodiment 1 of the present disclosure which is connected to a single-phase alternator.
Figure 2:
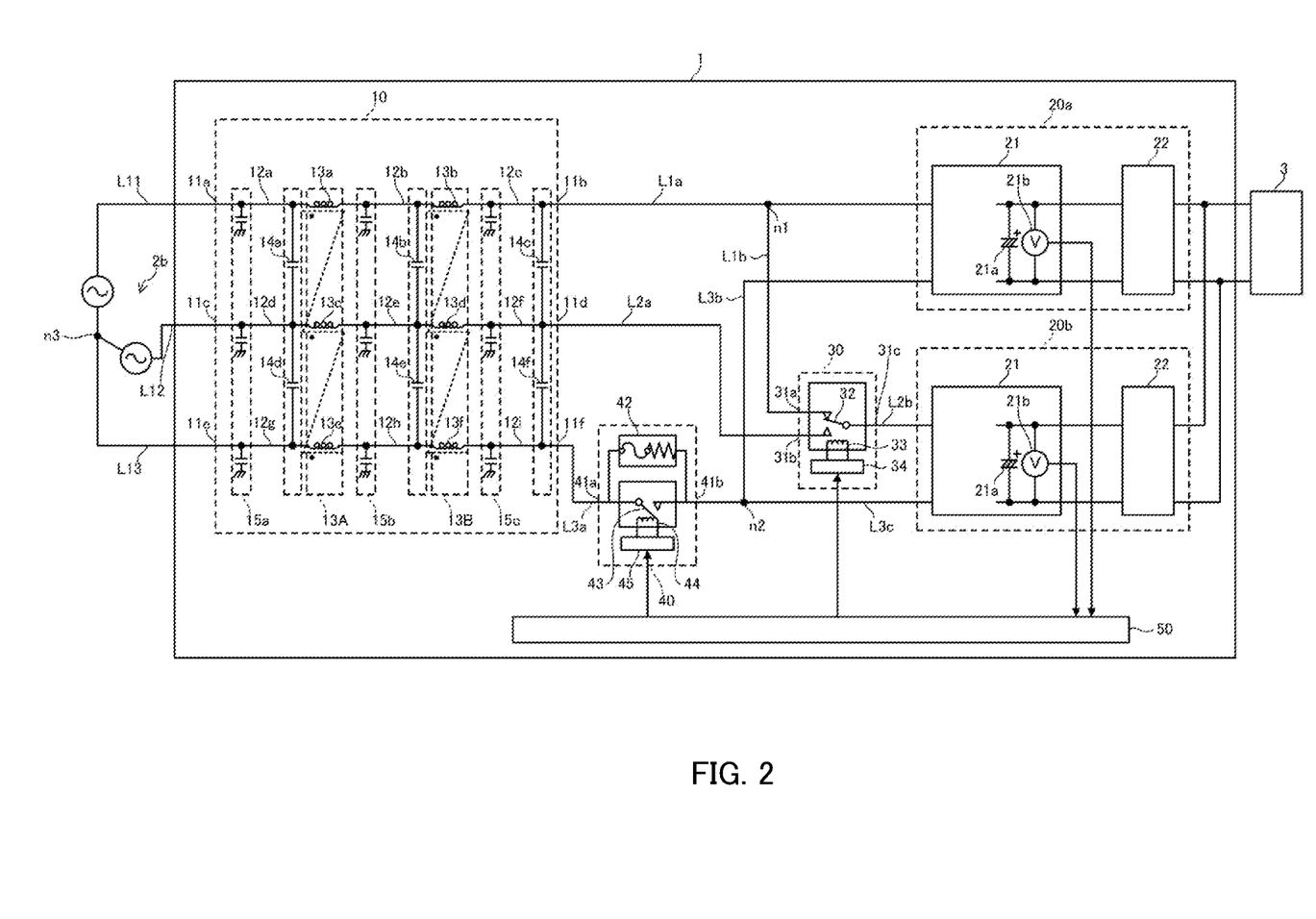
FIG. 2 is a block diagram illustrating the switched-mode power supply device according to Embodiment 1 of the present disclosure which is connected to a two-phase alternator.

To begin with, the configuration of switched-mode power supply device 1 according to Embodiment 1 is described with reference to FIGS. 1 and 2. FIG. 1 is a block diagram illustrating switched-mode power supply device 1 connected to single-phase alternator 2a. FIG. 2 is a block diagram illustrating switched-mode power supply device 1 connected to two-phase alternator 2b. Switched-mode power supply device 1 may, for example, be used for a charging device of a vehicle (e.g., an electric vehicle or a hybrid vehicle), or may also be used for other devices.

Switched-mode power supply device 1 is a device that converts alternating current power from single-phase alternator 2a or two-phase alternator 2b into direct current power, and outputs it to high voltage battery 3. High voltage battery 3 is a battery for motor driving of a vehicle, for example. Examples of high voltage battery 3 include a lithium-ion battery.

Switched-mode power supply device 1 includes power supply filter 10, power supply circuit 20a, power supply circuit 20b, switching circuit 30, inrush current prevention circuit 40, and control circuit 50. Switched-mode power supply device 1 is configured to include two power supply circuits 20a and 20b so as to be operable both when connected to single-phase alternator 2a and when connected to two-phase alternator 2b.

(Power Supply Filter)

The alternating current power is input into power supply filter 10 from single-phase alternator 2a or two-phase alternator 2b. Power supply filter 10 has a function to prevent noise from entering power supply circuits 20a and 20b and to prevent noise from flowing out of power supply circuits 20a and 20b.

Power supply filter 10 includes first terminal 11a and second terminal 11b that can be connected to the outside. Between first terminal 11a and second terminal 11b, line 12a, coil 13a, line 12b, coil 13b, and line 12c are disposed sequentially from the side of first terminal 11a.

Power supply filter 10 also includes third terminal 11c and fourth terminal 11d that can be connected to the outside. Between third terminal 11c and fourth terminal 11d, line 12d, coil 13c, line 12e, coil 13d, and line 12f are disposed sequentially from the side of third terminal 11c.

Further, power supply filter 10 includes fifth terminal 11e and sixth terminal 11f that can be connected to the outside. Between fifth terminal 11e and sixth terminal 11f, line 12g, coil 13e, line 12h, coil 13f, and line 12i are disposed sequentially from the side of fifth terminal 11e.

Coils 13a, 13c, and 13e form three-phase common-mode coil 13A composed of three windings wound on one core material. Coils 13a, 13c, and 13e in three-phase common-mode coil 13A are magnetically coupled to one another.

Coils 13b, 13d, and 13f form three-phase common-mode coil 13B composed of three windings wound on one core material. Coils 13b, 13d, and 13f in three-phase common-mode coil 13B are magnetically coupled to one another.

X-capacitor 14a is provided between lines 12a and 12d. X-capacitor 14d is provided between lines 12d and 12g. X-capacitor 14b is provided between lines 12b and 12e. X-capacitor 14e is provided between lines 12e and 12h. X-capacitor 14c is provided between lines 12c and 12f. X-capacitor 14f is provided between lines 12f and 12i. X-capacitors 14a to 14c serve to reduce normal-mode noise.

Y-capacitor 15a is provided for lines 12a, 12d, and 12g. Y-capacitor 15b is provided for lines 12b, 12e, and 12h. Y-capacitor 15c is provided for lines 12c, 12f, and 12i. Y-capacitors 15a to 15c serve to reduce common-mode noise.

That is, power supply filter 10 is a filter including two three-phase common-mode coils and three y-capacitors. Power supply filter 10 having the configuration as described above is a filter circuit in which all the lines for a plurality of phases are magnetically coupled to one another.

As illustrated in FIG. 1, when switched-mode power supply device 1 is connected to single-phase alternator 2a, first terminal 11a is connected to line L1 that is a power supply line on the positive electrode side of single-phase alternator 2a. Second terminal 11b is connected to line L1a. Line L1a is connected to the positive electrode side of power supply circuit 20a.

Third terminal 11c is not connected to any of the lines of single-phase alternator 2a. Fourth terminal 11d is connected to line L2a. Line L2a is connected to switching circuit 30.

Fifth terminal 11e is connected to line L3 that is a power supply line on the negative electrode side of single-phase alternator 2a. Sixth terminal 11f is connected to line L3a. Line L3a is connected to inrush current prevention circuit 40.

As illustrated in FIG. 2, when switched-mode power supply device 1 is connected to two-phase alternator 2b, first terminal 11a is connected to line L11 that is a power supply line on the first-phase positive electrode side of two-phase alternator 2b.

Third terminal 11c is connected to line L12 that is a power supply line on the second-phase positive electrode side of two-phase alternator 2b. Fifth terminal 11e is connected to line L13 that is a power supply line on the negative electrode side of two-phase alternator 2b.

(Power Supply Circuit)

Each of power supply circuits 20a and 20b includes AC/DC converter 21 and DC/DC converter 22.

AC/DC converter 21 is disposed in a subsequent stage of power supply filter 10. AC/DC converter 21 converts alternating current power from power supply filter 10 into direct current power, and outputs it to DC/DC converter 22.

AC/DC converter 21 includes electrolytic capacitor 21a for initial charging, and voltmeter 21b that measures the voltage of electrolytic capacitor 21a. The voltage value measured by voltmeter 21b is output to control circuit 50.

DC/DC converter 22 is disposed in a subsequent stage of AC/DC converter 21. DC/DC converter 22 transforms the voltage of the direct current power from AC/DC converter 21, and outputs it to high voltage battery 3.

(Switching Circuit)

Switching circuit 30 is a circuit that, when switched-mode power supply device 1 is connected to single-phase alternator 2a, switches between a first mode for supplying power from single-phase alternator 2a to both power supply circuits 20a and 20b and a second mode for supplying the power only to power supply circuit 20a.

Switching circuit 30 is also a circuit that, when switched-mode power supply device 1 is connected to two-phase alternator 2b, switches between a first mode for supplying first phase power from two-phase alternator 2b to both power supply circuits 20a and 20b and a second mode for supplying the first phase power to power supply circuit 20a while supplying second phase power to power supply circuit 20b.

In other words, switching circuit 30 allows switching of a phase connected to a power supply circuit (20b) of a plurality of power supply circuits (20a, 20b) not corresponding to a certain phase (first phase) of a polyphase alternator between the certain phase and a phase (second phase) to which this power supply circuit corresponds.

Switching circuit 30 includes first terminal 31a, second terminal 31b, third terminal 31c, switching relay 32, coil 33, and drive circuit 34. First terminal 31a is connected to line L1b branching off at branch point n1 on line L1a. Second terminal 31b is connected to line L2a. Third terminal 31c is connected to line L2b. Line L2b is connected to the positive electrode side of power supply circuit 20b.

Drive circuit 34 switches switching relay 32 on/off according to a control signal from control circuit 50. This control signal is a signal for indicating that switching relay 32 is to be turned on or off.

"Off" of switching relay 32 means a state where line L1b is connected to line L2b as illustrated in FIGS. 1 and 2. In addition, "on" of switching relay 32 means a state where line L2a is connected to line L2b.

(Inrush Current Prevention Circuit)

Inrush current prevention circuit 40 is disposed on the alternator side from meeting point n2 where line L3c that is a line on the negative electrode side of power supply circuit 20b meets line L3b that is a line on the negative electrode side of power supply circuit 20a. Inrush current prevention circuit 40 limits an inrush current.

Inrush current prevention circuit 40 includes: first terminal 41a; second terminal 41b; inrush current limiting circuit 42 consisting of a fuse and a rush current limiting resistance; inrush prevention relay 43; coil 44; and drive circuit 45. First terminal 41a is connected to line L3a. Second terminal 41b is connected to line L3b.

Drive circuit 45 switches inrush prevention relay 43 on/off according to a control signal from control circuit 50. This control signal is a signal for indicating that inrush prevention relay 43 is to be turned on or off.

"Off" of inrush prevention relay 43 means a state where power is supplied to inrush current limiting circuit 42 and inrush current prevention circuit 40 functions as illustrated in FIGS. 1 and 2. In addition, "on" of inrush prevention relay 43 means a state where inrush current prevention circuit 40 is stopped from functioning.

(Control Circuit)

Control circuit 50 is composed, for example, of a Central Processing Unit (CPU), Read Only Memory (ROM), Random Access Memory (RAM), and/or the like. Control circuit 50 outputs, to switching circuit 30, the signal for turning switching relay 32 on/off. Control circuit 50 also outputs, to inrush current prevention circuit 40, the signal for turning inrush prevention relay 43 on/off.

For example, control circuit 50 allows the initial charging of electrolytic capacitors 21a of a plurality of power supply circuits to be carried out while controlling switching circuit 30 such that the phase connected to the power supply circuit not corresponding to a certain phase is switched to the certain phase, and while causing inrush current prevention circuit 40 to function.

Specifically, control circuit 50 outputs, to switching circuit 30, the signal for turning off switching relay 32 such that power supply circuit 20b is connected to line L1b. Moreover, control circuit 50 outputs, to inrush current prevention circuit 40, the signal for turning inrush prevention relay 43 off, so as to cause inrush current prevention circuit 40 to function. In this configuration, the initial charging of electrolytic capacitors 21a of power supply circuits 20a and 20b is carried out.

Then, when the initial charging of electrolytic capacitors 21a is completed, control circuit 50 causes high voltage battery 3 to be charged while controlling switching circuit 30 such that the phase connected to the power supply circuit not corresponding to the certain phase is switched to the phase to which this power supply circuit corresponds, and while stopping inrush current prevention circuit 40 from functioning.

Specifically, when the initial charging of electrolytic capacitors 21a is completed, control circuit 50 outputs, to switching circuit 30, the signal for turning on switching relay 32 such that power supply circuit 20b is connected to line L2a. Moreover, control circuit 50 outputs, to inrush current prevention circuit 40, the signal for turning on inrush prevention relay 43, so as to stop inrush current prevention circuit 40 from functioning. In this configuration, high voltage battery 3 is charged.

(Description of Operation)

Figure 3:
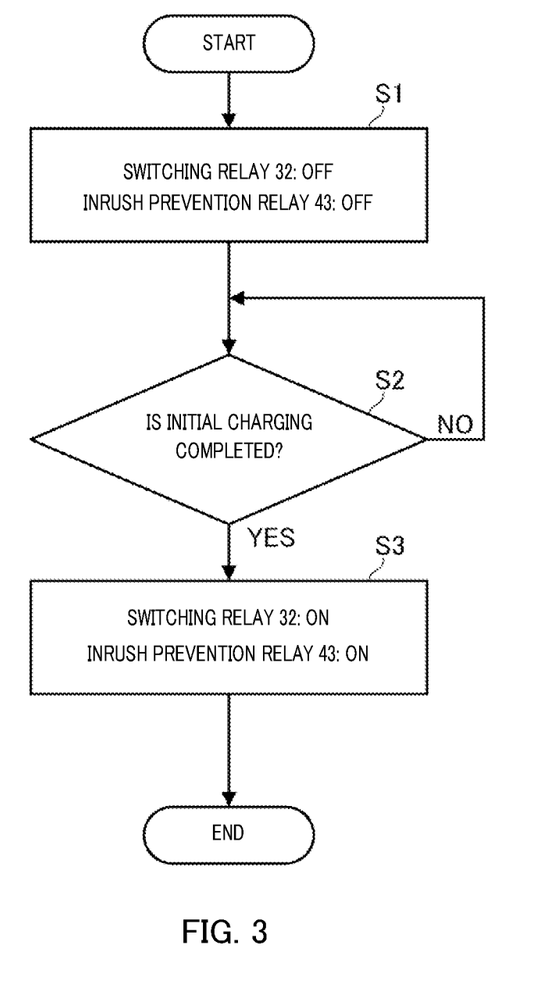
FIG. 3 is a flowchart illustrating one example of operation of the switched-mode power supply device according to Embodiment 1 of the present disclosure.

Next, one example of operation of switched-mode power supply device 1 is described with reference to FIG. 3. FIG. 3 is a flowchart illustrating one example of operation of switched-mode power supply device 1. The operation described below is started, for example, when switched-mode power supply device 1 is powered by single-phase alternator 2a or two-phase alternator 2b. Note that, both of switching relay 32 and inrush prevention relay 43 are off when switched-mode power supply device 1 is powered by single-phase alternator 2a or two-phase alternator 2b.

To begin with, control circuit 50 controls switching circuit 30 and inrush current prevention circuit 40 at step S1 such that the initial charging of electrolytic capacitors 21a of power supply circuits 20a and 20b is carried out. Specifically, control circuit 50 leaves switching relay 32 and inrush prevention relay 43 off.

Since both of switching relay 32 and inrush prevention relay 43 are off, the power supplied from single-phase alternator 2a or two-phase alternator 2b is supplied to power supply circuit 20a via line L1a from line L1 or L11. The power supplied from single-phase alternator 2a or two-phase alternator 2b is also supplied to power supply circuit 20b via line L1b and line L2b and to inrush current limiting circuit 42 of inrush current prevention circuit 40.

Accordingly, in the case of single-phase alternator 2a, a circuit configuration is used in which power supply circuits 20a and 20b and inrush current limiting circuit 42 are connected between line L1 that is the power supply line on the positive electrode side and the line L3 that is the power supply line on the negative electrode side. In addition, in the case of two-phase alternator 2b, a circuit configuration is used in which power supply circuits 20a and 20b and inrush current limiting circuit 42 are connected between line L11 that is the power supply line on the first-phase positive electrode side and neutral point n3. It is thus possible to carry out the initial charging of electrolytic capacitors 21a of power supply circuits 20a and 20b while preventing the inrush current from flowing into power supply circuits 20a and 20b (first mode).

At step S2 following step S1, control circuit 50 determines whether or not the initial charging of electrolytic capacitors 21a of power supply circuits 20a and 20b is completed. The measured values of voltmeters 21b are used for this determination.

When the initial charging of electrolytic capacitors 21a is not completed (step S2: NO), the processing of step S2 is repeated. On the other hand, when the initial charging of electrolytic capacitors 21a is completed (step S2: YES), the processing proceeds to step S3.

Control circuit 50 controls switching circuit 30 and inrush current prevention circuit 40 at step S3 such that high voltage battery 3 is charged. Specifically, control circuit 50 controls switching circuit 30 and inrush current prevention circuit 40 such that both of switching relay 32 and inrush prevention relay 43 are turned on.

Accordingly, in the case of single-phase alternator 2a, the power supplied from single-phase alternator 2a is supplied to power supply circuit 20a via line L1a from line L1. Power supply circuit 20b is not supplied with the power from single-phase alternator 2a.

Accordingly, a circuit configuration is used in which power supply circuit 20a is connected between line L1 that is the power supply line on the positive electrode side and line L3 that is the power supply line on the negative electrode side. Therefore, only power supply circuit 20a is driven, and high voltage battery 3 is charged (second mode).

Additionally, in the case of two-phase alternator 2b, the power supplied from two-phase alternator 2b is supplied to power supply circuit 20a via line L1a from line L11 and to power supply circuit 20b via line L2a and line L2b from line L12.

Accordingly, a circuit configuration is used in which power supply circuit 20a is connected between line L11 that is the power supply line on the first-phase positive electrode side and neutral point n3 and power supply circuit 20b is connected between line L12 that is the power supply line on the second-phase positive electrode side and neutral point n3. Therefore, both of power supply circuits 20a and 20b are driven, and high voltage battery 3 is charged (second mode).

(Comparison with Comparative Example)

Figure 4:
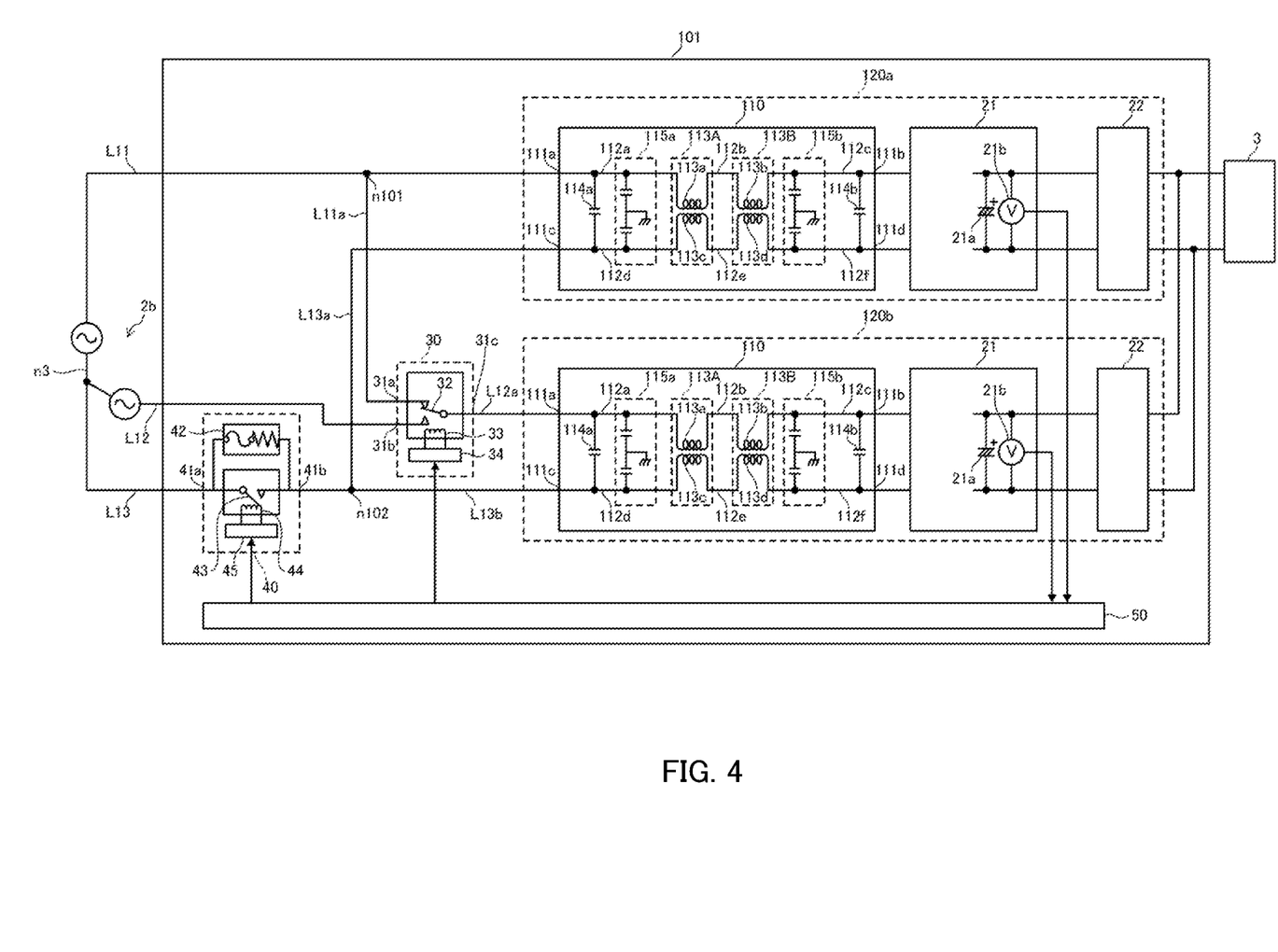
FIG. 4 is a block diagram illustrating a switched-mode power supply device according to a comparative example which is connected to the two-phase alternator.

Here, switched-mode power supply device 101 as a comparative example of the present embodiment which is connected to two-phase alternator 2b is illustrated in FIG. 4. Note that, the same components between FIGS. 2 and 4 are provided with the same reference symbols, and descriptions of such components will be omitted.

As illustrated in FIG. 4, power supply circuits 120a and 120b respectively include power supply filters 110 in switched-mode power supply device 101.

Each of power supply filters 110 includes first terminal 111a and second terminal 111b. Between first terminal 111a and second terminal 111b, line 112a, coil 113a, line 112b, coil 113b, and line 112c are disposed sequentially from the side of first terminal 111a.

Each of power supply filters 110 includes third terminal 111c and fourth terminal 111d. Between third terminal 111c and fourth terminal 111d, line 112d, coil 113c, line 112e, coil 113d, and line 112f are disposed sequentially from the side of third terminal 111c.

Coils 113a and 113c form single-phase common-mode coil 113A composed of two windings wound on one core material. Coils 113a and 113c in single-phase common-mode coil 113A are magnetically coupled to each other.

Coils 113b and 113d form single-phase common-mode coil 113B composed of two windings wound on one core material. Coils 113b and 113d in single-phase common-mode coil 113B are magnetically coupled to each other.

There is x-capacitor 114a connected between line 112a and line 112d. There is x-capacitor 114b connected between line 112c and line 112f.

Y-capacitor 115a is provided for lines 112a and 112d. Y-capacitor 115b is provided for lines 112c and 112f.

That is, power supply filter 110 includes two single-phase common-mode coils and two y-capacitors. Since switched-mode power supply device 101 includes power supply circuits 120a and 120b, switched-mode power supply device 101 includes four single-phase common-mode coils and four y-capacitors.

Moreover, power supply filters 110 are disposed more closely with respect to high voltage battery 3 than switching circuit 30 and inrush current prevention circuit 40 are. Such a configuration necessitates a noise removal filter (not illustrated in FIG. 4) for a relay-driving driver circuit of each of switching circuit 30 and inrush current prevention circuit 40.

In switched-mode power supply device 1 of the present embodiment as opposed to this configuration, power supply filter 10 that is a filter circuit in which all the lines for a plurality of phases are magnetically coupled to one another is disposed more closely with respect to the alternator than switching circuit 30 and inrush current prevention circuit 40 are. It is therefore possible to dispense with noise removal filters for switching circuit 30 and inrush current prevention circuit 40 so as to miniaturize the device. It is also possible to reduce the number of y-capacitors.

Embodiment 2

Figure 5:
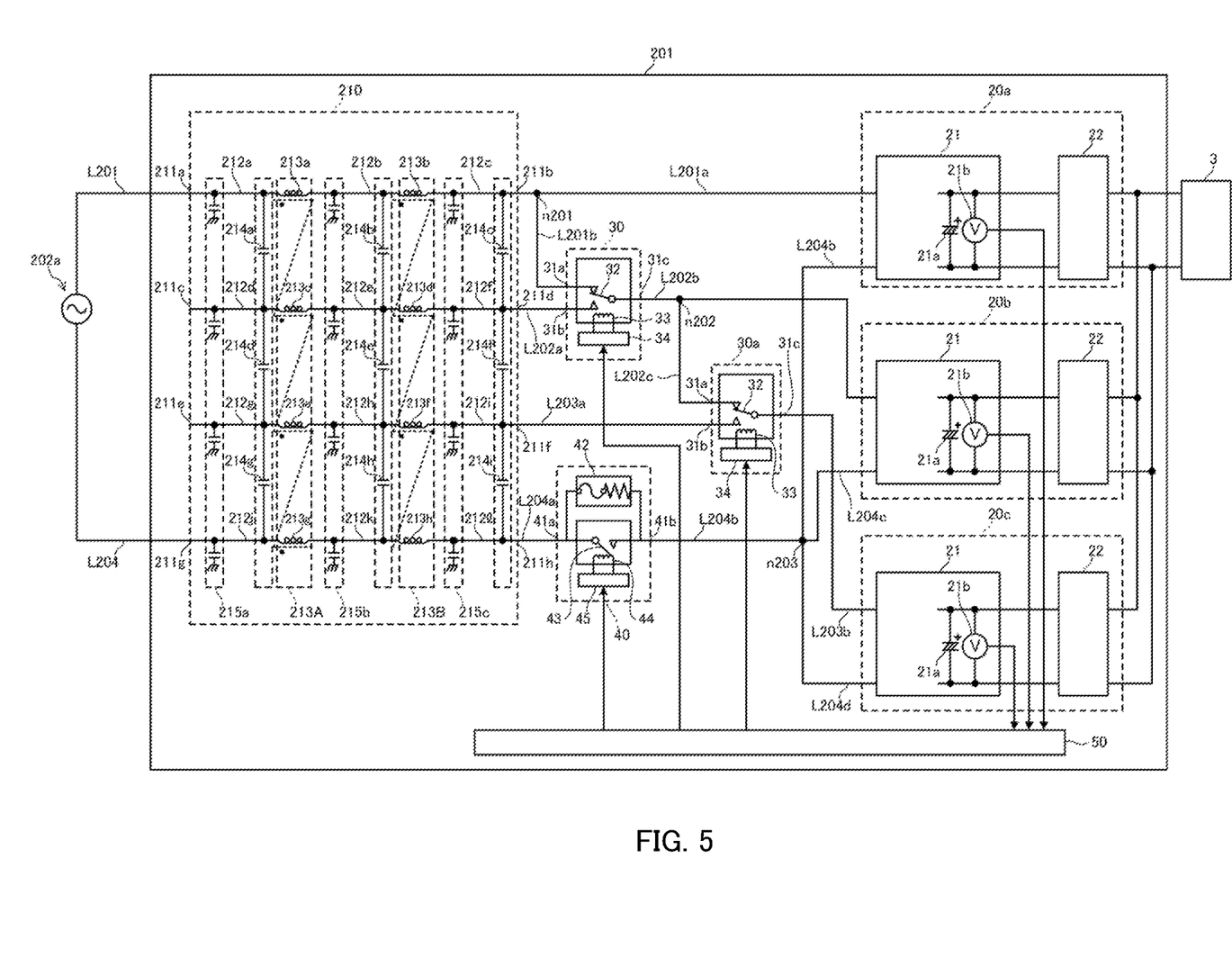
FIG. 5 is a block diagram illustrating a switched-mode power supply device according to Embodiment 2 of the present disclosure which is connected to the single-phase alternator.
Figure 6:
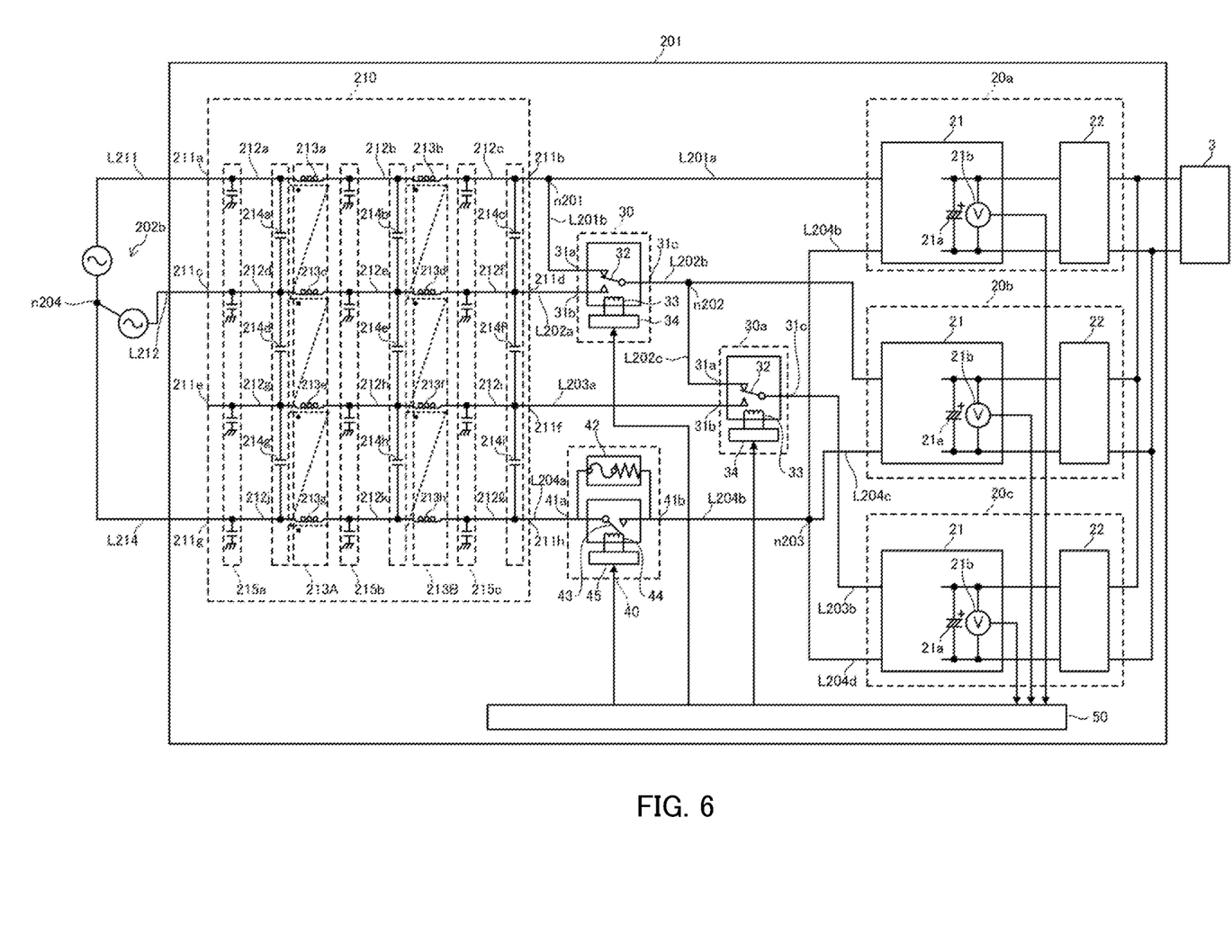
FIG. 6 is a block diagram illustrating the switched-mode power supply device according to Embodiment 2 of the present disclosure which is connected to the two-phase alternator.
Figure 7:
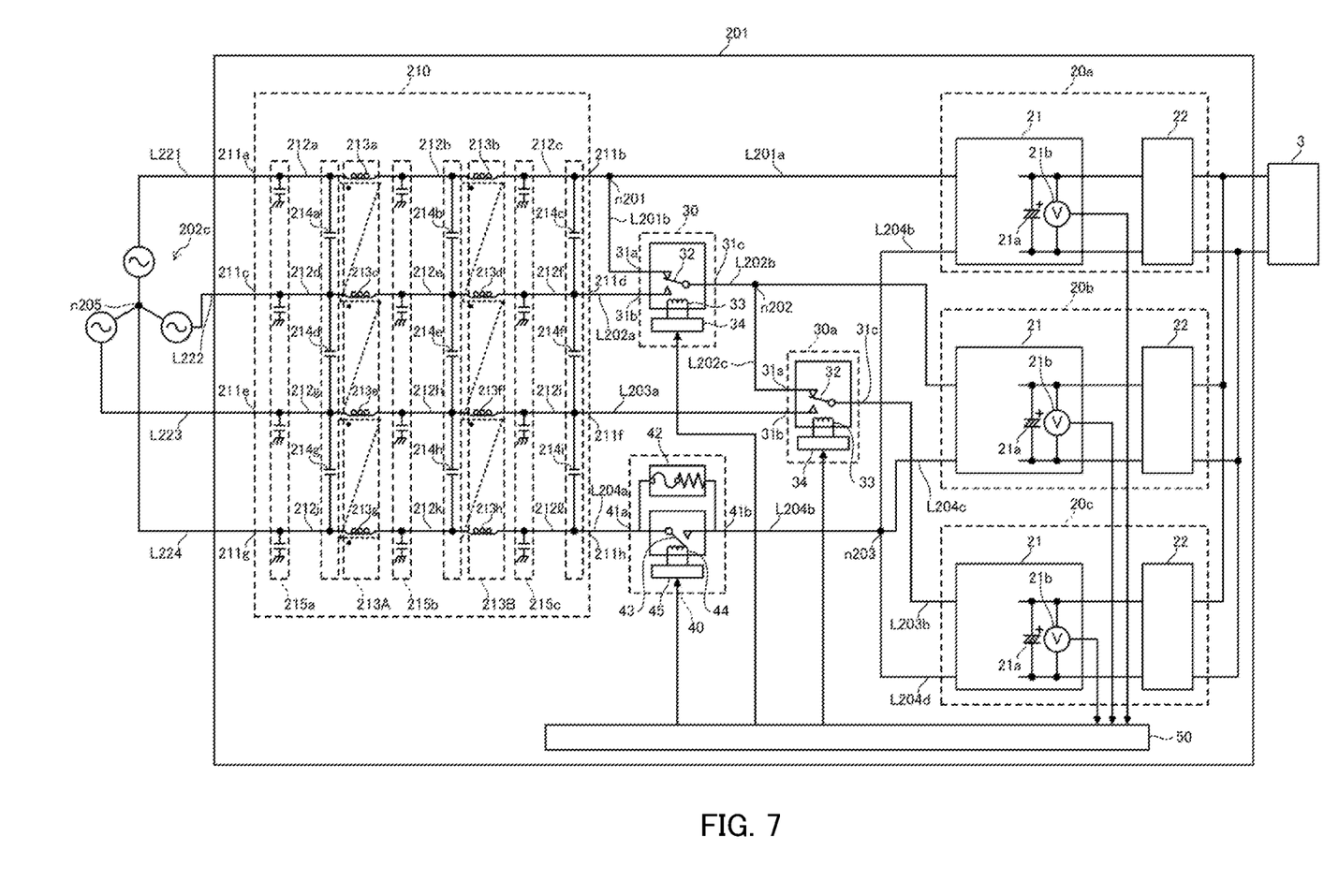
FIG. 7 is a block diagram illustrating the switched-mode power supply device according to Embodiment 2 of the present disclosure which is connected to a three-phase alternator.

Next, a configuration of switched-mode power supply device 201 according to Embodiment 2 is described with reference to FIGS. 5 to 7. FIG. 5 is a block diagram illustrating switched-mode power supply device 201 connected to single-phase alternator 202a. FIG. 6 is a block diagram illustrating switched-mode power supply device 201 connected to two-phase alternator 202b. FIG. 7 is a block diagram illustrating switched-mode power supply device 201 connected to three-phase alternator 202c. Note that, the same components between FIGS. 1 and 2 and FIGS. 5 to 7 are provided with the same reference symbols, and descriptions of such components will be omitted.

Switched-mode power supply device 201 is a device that converts alternating current power from single-phase alternator 202a, two-phase alternator 202b, or three-phase alternator 202c into direct current power, and outputs it to high voltage battery 3.

Switched-mode power supply device 201 includes power supply filter 210, power supply circuit 20a, power supply circuit 20b, power supply circuit 20c, switching circuit 30, switching circuit 30a, inrush current prevention circuit 40, and control circuit 50. Switched-mode power supply device 201 is configured to include three power supply circuits 20a, 20b, and 20c so as to be always operable, whether connected to single-phase alternator 202a, two-phase alternator 202b, or three-phase alternator 202c.

Switched-mode power supply device 201 according to Embodiment 2 differs from switched-mode power supply device 1 according to Embodiment 1 described above in respect of a particular configuration of the power supply filter and in that there are the additional power supply circuit and the additional switching circuit. Since the configuration of power supply circuit 20c is the same as the configuration of power supply circuits 20a and 20b, its detailed description is omitted.

(Power Supply Filter)

The alternating current power is input into power supply filter 210 from single-phase alternator 202a, two-phase alternator 202b, or three-phase alternator 202c. Power supply filter 210 has a function to prevent noise from entering power supply circuits 20a, 20b, and 20c and to prevent noise from flowing out of power supply circuits 20a, 20b, and 20c.

Power supply filter 210 includes first terminal 211a and second terminal 211b that can be connected to the outside. Between first terminal 211a and second terminal 211b, line 212a, coil 213a, line 212b, coil 213b, and line 212c are disposed sequentially from the side of first terminal 211a.

Power supply filter 210 includes third terminal 211c and fourth terminal 211d that can be connected to the outside. Between third terminal 211c and fourth terminal 211d, line 212d, coil 213c, line 212e, coil 213d, and line 212f are disposed sequentially from the side of third terminal 211c.

Power supply filter 210 includes fifth terminal 211e and sixth terminal 211f that can be connected to the outside. Between fifth terminal 211e and sixth terminal 211f, line 212g, coil 213e, line 212h, coil 213f, and line 212i are disposed sequentially from the side of fifth terminal 211e.

Power supply filter 210 includes seventh terminal 211g and eighth terminal 211h that can be connected to the outside. Between seventh terminal 211g and eighth terminal 211h, line 212j, coil 213g, line 212k, coil 213h, and line 212l are disposed sequentially from the side of seventh terminal 211g.

Coils 213a, 213c, 213e, and 213g form three-phase common-mode coil 213A composed of four windings wound on one core material. Coils 213a, 213c, 213e, and 213g in three-phase common-mode coil 213A are magnetically coupled to one another.

Coils 213b, 213d, 213f, and 213h form three-phase common-mode coil 213B composed of four windings wound on one core material. Coils 213b, 213d, 213f, and 213h in three-phase common-mode coil 213B are magnetically coupled to one another.

X-capacitors 214a, 214d, and 214g are respectively provided between lines 212a and 212d, between lines 212d and 212g, and between lines 212g and 212j. X-capacitors 214b, 214e, and 214h are respectively provided between lines 212b and 212e, between lines 212e and 212h, and between lines 212h and 212k. X-capacitors 214c, 214f, and 214i are respectively provided between lines 212c and 212f, between lines 212f and 212i, and between lines 212i and 212l.

Y-capacitor 215a is provided for lines 212a, 212d, 212g, and 212j. Y-capacitor 215b is provided for lines 212b, 212e, 212h, and 212k. Y-capacitor 215c is provided for lines 212c, 212f, 212i, and 212l.

That is, power supply filter 210 includes two three-phase common-mode coils and three y-capacitors. Power supply filter 210 having the configuration as described above is a filter circuit in which all the lines for a plurality of phases are magnetically coupled to one another.

As illustrated in FIG. 5, when switched-mode power supply device 201 is connected to single-phase alternator 202a, first terminal 211a is connected to line L201 that is a power supply line on the positive electrode side of single-phase alternator 202a. Second terminal 211b is connected to line L201a. Line L201a is connected to the positive electrode side of power supply circuit 20a.

Third terminal 211c is not connected to any of the lines of single-phase alternator 202a. Fourth terminal 211d is connected to line L202a. Line L202a is connected to switching circuit 30.

Fifth terminal 211e is not connected to any of the lines of single-phase alternator 202a. Sixth terminal 211f is connected to line L203a. Line L203a is connected to switching circuit 30a.

Seventh terminal 211g is connected to line L204 that is a power supply line on the negative electrode side of single-phase alternator 202a. Eighth terminal 211h is connected to line L204a. Line L204a is connected to inrush current prevention circuit 40.

As illustrated in FIG. 6, when switched-mode power supply device 201 is connected to two-phase alternator 202b, first terminal 211a is connected to line L211 that is a power supply line on the first-phase positive electrode side of two-phase alternator 202b.

Third terminal 211c is connected to line L212 that is a power supply line on the second-phase positive electrode side of two-phase alternator 202b. Fifth terminal 211e is not connected to any of the lines of two-phase alternator 202b. Seventh terminal 211g is connected to line L214 that is a power supply line on the negative electrode side of two-phase alternator 202b.

As illustrated in FIG. 7, when switched-mode power supply device 201 is connected to three-phase alternator 202c, first terminal 211a is connected to line L221 that is a power supply line on the first-phase positive electrode side of three-phase alternator 202c.

Third terminal 211c is connected to line L222 that is a power supply line on the second-phase positive electrode side of three-phase alternator 202c. Fifth terminal 211e is connected to line L223 that is a power supply line on the third-phase positive electrode side of three-phase alternator 202c. Seventh terminal 211g is connected to line L224 that is a power supply line on the negative electrode side of three-phase alternator 202c.

(Switching Circuit)

Switching circuits 30 and 30a are a circuit that, when switched-mode power supply device 201 is connected to single-phase alternator 202a, switches between a first mode for supplying power from single-phase alternator 202a to all power supply circuits 20a, 20b, and 20c and a second mode for supplying the power only to power supply circuit 20a.

Switching circuits 30 and 30a are also a circuit that, when switched-mode power supply device 201 is connected to two-phase alternator 202b, switches between a first mode for supplying first phase power from two-phase alternator 202b to all power supply circuits 20a, 20b, and 20c and a second mode for supplying the first phase power to power supply circuit 20a while supplying second phase power to power supply circuit 20b.

Switching circuits 30 and 30a are also a circuit that, when switched-mode power supply device 201 is connected to three-phase alternator 202c, switches between a first mode for supplying first phase power from three-phase alternator 202c to all power supply circuits 20a, 20b, and 20c and a second mode for supplying the first phase power to power supply circuit 20a, supplying second phase power to power supply circuit 20b, while supplying third phase power to power supply circuit 20c.

In other words, switching circuits 30 and 30a allow switching of a phase connected to a power supply circuit (20b, 20c) of a plurality of power supply circuits (20a, 20b, 20c) not corresponding to a certain phase (first phase) of a polyphase alternator between the certain phase and a phase (second phase or third phase) to which this power supply circuit corresponds.

First terminal 31a of switching circuit 30 is connected to line L201b branching off at branch point n201 on line L201a. Second terminal 31b of switching circuit 30 is connected to line L202a. Third terminal 31c of switching circuit 30 is connected to line L202b. Line L202b is connected to the positive electrode side of power supply circuit 20b.

"Off" of switching relay 32 of switching circuit 30 means a state where line L201b is connected to line L202b as illustrated in FIGS. 5 to 7. In addition, "on" of switching relay 32 of switching circuit 30 means a state where line L202a is connected to line L202b.

First terminal 31a of switching circuit 30a is connected to line L202c branching off at branch point n202 on line L202b. Second terminal 31b of switching circuit 30a is connected to line L203a. Third terminal 31c of switching circuit 30a is connected to line L203b. Line L203b is connected to the positive electrode side of power supply circuit 20c.

"Off" of switching relay 32 of switching circuit 30a means a state where line L202c is connected to line L203b as illustrated in FIGS. 5 to 7. In addition, "on" of switching relay 32 of switching circuit 30a means a state where line L203a is connected to line L203b.

Note that, although there is the branch line connected to switching circuit 30a in a subsequent stage of switching circuit 30 to which the line branching off from line L201a is connected in FIGS. 5 to 7, the present disclosure is not limited to this embodiment. For example, a line branching off from line L201a may be connected to switching circuits 30 and 30a.

(Inrush Current Prevention Circuit)

Inrush current prevention circuit 40 is disposed on the alternator side from meeting point n203 where line L204c that is a line on the negative electrode side of power supply circuit 20b and line L204d that is a line on the negative electrode side of power supply circuit 20c meet line L204b that is a line on the negative electrode side of power supply circuit 20*a*. Inrush current prevention circuit 40 limits an inrush current.

Note that, although the lines on the negative electrode side of power supply circuits 20*a* to 20*c* are connected together at meeting point n203 in FIGS. 5 to 7, the present disclosure is not limited to this embodiment. For example, a first meeting point where line L204*b* and line L204*c* are connected together may also be other than a second meeting point where line L204*b* and line L204*d* are connected together. In this case, inrush current prevention circuit 40 is disposed on the alternator side from the first and the second meeting points.

(Control Circuit)

Control circuit 50 outputs, to switching circuits 30 and 30*a*, a signal for turning switching relays 32 on/off. Control circuit 50 also outputs, to inrush current prevention circuit 40, a signal for turning inrush prevention relay 43 on/off.

For example, control circuit 50 allows the initial charging of electrolytic capacitors 21*a* of a plurality of power supply circuits to be carried out while controlling switching circuits 30 and 30*a* such that the phase connected to the power supply circuit not corresponding to a certain phase is switched to the certain phase, and while causing inrush current prevention circuit 40 to function.

Specifically, control circuit 50 outputs, to switching circuit 30, the signal for turning off switching relay 32 such that power supply circuit 20*b* is connected to line L201*b*. Control circuit 50 also outputs, to switching circuit 30*a*, the signal for turning off switching relay 32 such that power supply circuit 20*c* is connected to line L202*c*.

Moreover, control circuit 50 outputs, to inrush current prevention circuit 40, the signal for turning off inrush prevention relay 43, so as to cause inrush current prevention circuit 40 to function. In this configuration, the initial charging of electrolytic capacitors 21*a* of power supply circuits 20*a*, 20*b*, and 20*c* is carried out.

Then, when the initial charging of electrolytic capacitors 21*a* is completed, control circuit 50 controls switching circuits 30 and 30*a* such that the phase connected to the power supply circuit not corresponding to the certain phase is switched to the phase to which this power supply circuit corresponds, and control circuit 50 stops inrush current prevention circuit 40 from functioning.

Specifically, when the initial charging of electrolytic capacitors 21*a* is completed, control circuit 50 outputs, to switching circuit 30, the signal for turning on switching relay 32 such that power supply circuit 20*b* is connected to line L202*a*. Control circuit 50 also outputs, to switching circuit 30*a*, the signal for turning on switching relay 32 such that power supply circuit 20*c* is connected to line L203*a*.

Moreover, control circuit 50 outputs, to inrush current prevention circuit 40, the signal for turning on inrush prevention relay 43, so as to stop inrush current prevention circuit 40 from functioning. In this configuration, high voltage battery 3 is charged.

(Description of Operation)

Figure 8:
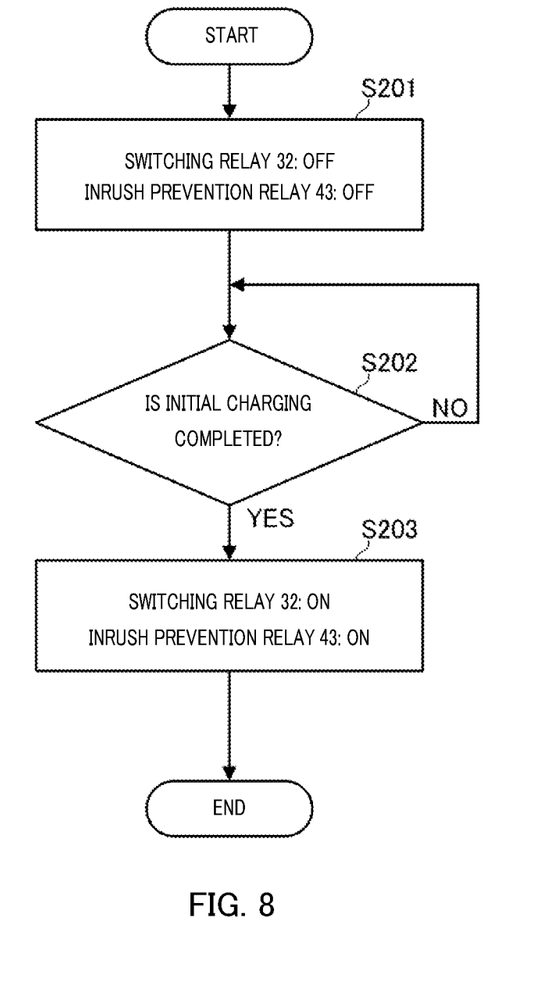
FIG. 8 is a flowchart illustrating one example of operation of the switched-mode power supply device according to Embodiment 2 of the present disclosure.

Next, one example of operation of switched-mode power supply device 201 is described with reference to FIG. 8. FIG. 8 is a flowchart illustrating one example of operation of switched-mode power supply device 201. The operation described below is started, for example, when switched-mode power supply device 201 is powered by single-phase alternator 202*a*, two-phase alternator 202*b*, or three-phase alternator 202*c*. Note that, all of switching relays 32 of switching circuits 30 and 30*a* and inrush prevention relay 43 are off when switched-mode power supply device 201 is powered by single-phase alternator 202*a*, two-phase alternator 202*b*, or three-phase alternator 202*c*.

To begin with, control circuit 50 controls switching circuits 30 and 30*a* and inrush current prevention circuit 40 at step S201 such that the initial charging of electrolytic capacitors 21*a* of power supply circuits 20*a*, 20*b*, and 20*c* is carried out. Specifically, control circuit 50 leaves switching relays 32 of switching circuits 30 and 30*a* and inrush prevention relay 43 off.

Since all of switching relays 32 of switching circuits 30 and 30*a* and inrush prevention relay 43 are off, the power supplied from the alternator is supplied to power supply circuit 20*a* via line L201*a*. The power supplied from the alternator is supplied also to power supply circuit 20*b* via line L201*b* and line L202*b*. The power supplied from the alternator is supplied also to power supply circuit 20*c* via line L202*c* and line L203*b*. The power supplied from the alternator is supplied also to inrush current limiting circuit 42 of inrush current prevention circuit 40.

Accordingly, in the case of single-phase alternator 202*a*, a circuit configuration is used in which power supply circuits 20*a*, 20*b*, and 20*c* and inrush current limiting circuit 42 are connected between line L201 that is the power supply line on the positive electrode side and the line L204 that is the power supply line on the negative electrode side. In addition, in the case of two-phase alternator 202*b*, a circuit configuration is used in which power supply circuits 20*a*, 20*b*, and 20*c* and inrush current limiting circuit 42 are connected between line L211 that is the power supply line on the first-phase positive electrode side and neutral point n204. In addition, in the case of three-phase alternator 202*c*, a circuit configuration is used in which power supply circuits 20*a*, 20*b*, and 20*c* and inrush current limiting circuit 42 are connected between line L221 that is the power supply line on the first-phase positive electrode side and neutral point n205. It is thus possible to carry out the initial charging of electrolytic capacitors 21*a* of power supply circuits 20*a*, 20*b*, and 20*c* while preventing the inrush current from flowing into power supply circuits 20*a*, 20*b*, and 20*c* (first mode).

At step S202 following step S201, control circuit 50 determines whether or not the initial charging of electrolytic capacitors 21*a* of power supply circuits 20*a*, 20*b*, and 20*c* is completed. The measured values of voltmeters 21*b* are used for this determination.

When the initial charging of electrolytic capacitors 21*a* is not completed (step S202: NO), the processing of step S202 is repeated. On the other hand, when the initial charging of electrolytic capacitors 21*a* is completed (step S202: YES), the processing proceeds to step S203.

Control circuit 50 controls switching circuits 30 and 30*a* and inrush current prevention circuit 40 at step S203 such that high voltage battery 3 is charged. Specifically, control circuit 50 controls switching circuits 30 and 30*a* and inrush current prevention circuit 40 such that all of switching relays 32 of switching circuits 30 and 30*a* and inrush prevention relay 43 are turned on.

Accordingly, in the case of single-phase alternator 202*a*, the power supplied from single-phase alternator 202*a* is supplied to power supply circuit 20*a* via line L201*a* from line L201. Power supply circuits 20*b* and 20*c* are not supplied with the power from single-phase alternator 202*a*.

Accordingly, a circuit configuration is used in which power supply circuit 20*a* is connected between line L201 that is the power supply line on the positive electrode side and line L204 that is the power supply line on the negative electrode side. Therefore, only power supply circuit 20a is driven, and high voltage battery 3 is charged (second mode).

Additionally, in the case of two-phase alternator 202b, the power supplied from two-phase alternator 202b is supplied to power supply circuit 20a via line L201a from line L211 and to power supply circuit 20b via line L202a and line L202b from line L212. Power supply circuit 20c is not supplied with the power from two-phase alternator 202b.

Accordingly, a circuit configuration is used in which power supply circuit 20a is connected between line L211 that is the power supply line on the first-phase positive electrode side and neutral point n204 and power supply circuit 20b is connected between line L212 that is the power supply line on the second-phase positive electrode side and neutral point n204. Therefore, power supply circuits 20a and 20b are driven, and high voltage battery 3 is charged (second mode).

In addition, in the case of three-phase alternator 202c, the power supplied from three-phase alternator 202c is supplied to power supply circuit 20a via line L201a from line L221, to power supply circuit 20b via line L202a and line L202b from line L222, and to power supply circuit 20c via line L203a and line L203b from line L223.

Thus, power supply circuit 20a is connected between line L221 that is the power supply line on the first-phase positive electrode side and neutral point n205. Power supply circuit 20b is connected between line L222 that is the power supply line on the second-phase positive electrode side and neutral point n205. Power supply circuit 20c is connected between line L223 that is the power supply line on the third-phase positive electrode side and neutral point n205. With this circuit configuration, all of power supply circuits 20a, 20b, and 20c are driven, and high voltage battery 3 is charged (second mode).

(Comparison with Comparative Example)

Figure 9:
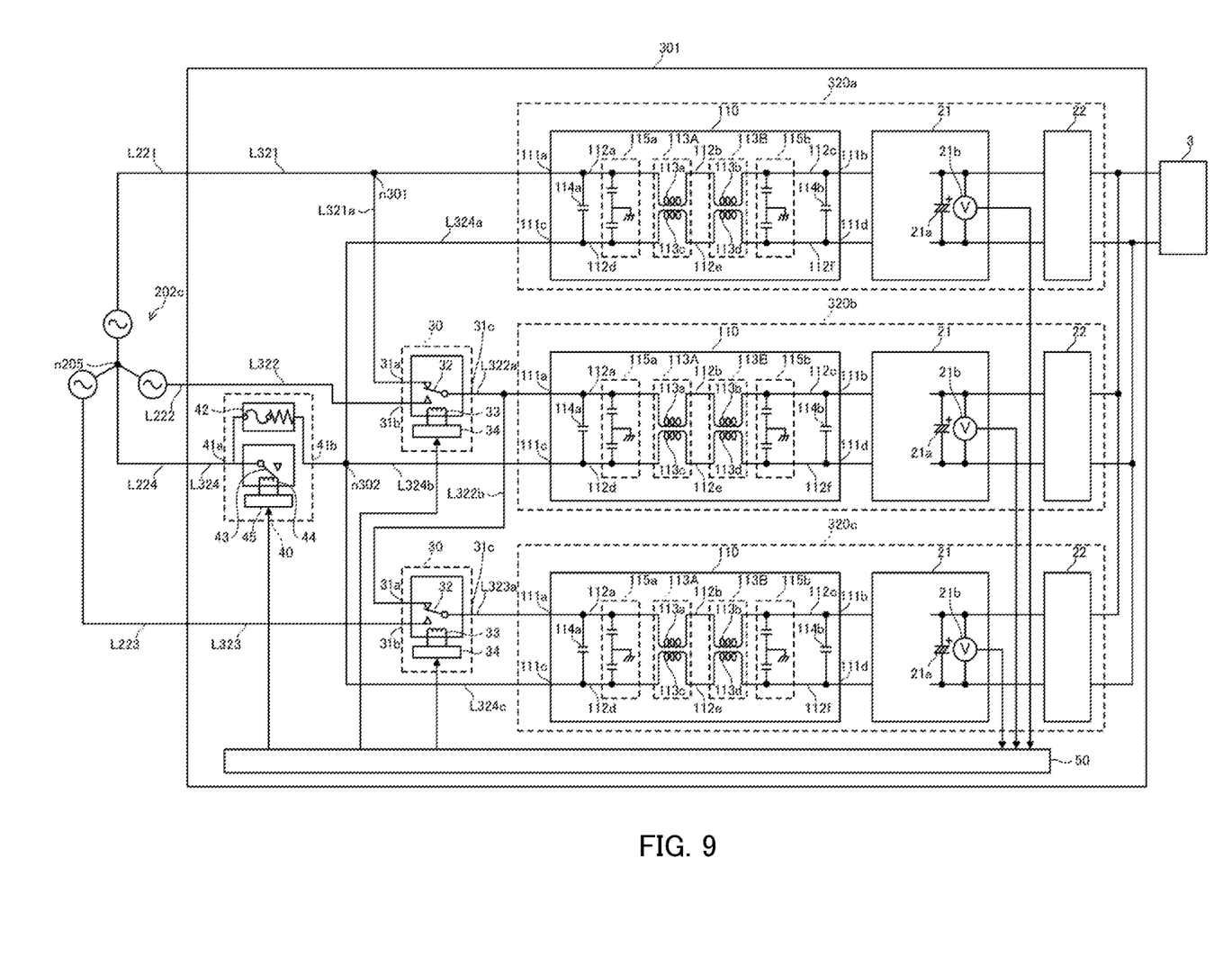
FIG. 9 is a block diagram illustrating the switched-mode power supply device according to the comparative example which is connected to the three-phase alternator.

Here, switched-mode power supply device 301 as a comparative example of the present embodiment which is connected to three-phase alternator 202c is illustrated in FIG. 9. Note that, the same components between FIGS. 7 and 9 are provided with the same reference symbols, and descriptions of such components will be omitted.

As illustrated in FIG. 9, power supply circuits 320a, 320b, and 320c respectively include power supply filters 110 in switched-mode power supply device 301.

As described above, each of power supply filters 110 includes two single-phase common-mode coils and two y-capacitors. Since switched-mode power supply device 301 includes power supply circuits 320a, 320b, and 320c, switched-mode power supply device 301 includes six single-phase common-mode coils and six y-capacitors.

Moreover, power supply filters 110 are disposed more closely with respect to high voltage battery 3 than switching circuits 30 and 30a and inrush current prevention circuit 40 are. Such a configuration necessitates a noise removal filter (not illustrated in FIG. 9) for a relay-driving driver circuit of each of switching circuits 30 and 30a and inrush current prevention circuit 40.

In switched-mode power supply device 201 of the present embodiment as opposed to this configuration, power supply filter 210 that is the filter circuit in which all the lines for a plurality of phases are magnetically coupled to one another is disposed more closely with respect to the alternator than switching circuits 30 and 30a and inrush current prevention circuit 40 are. It is therefore possible to dispense with noise removal filters for switching circuits 30 and 30a and inrush current prevention circuit 40 so as to miniaturize the device. It is also possible to reduce the number of y-capacitors.

The disclosure of Japanese Patent Application No. 2017-246187 filed on Dec. 22, 2017 including the specification, drawings and abstract is incorporated herein by reference in its entirety.

INDUSTRIAL APPLICABILITY

According to the switched-mode power supply device according to the present disclosure, it is possible to dispense with a noise removal filter for a relay-driving driver circuit so as to miniaturize the device, and the switched-mode power supply device is suitable for use in vehicles.

REFERENCE SIGNS LIST 1, 101, 201, 301 Switched-mode power supply device
2a Single-phase alternator
2b Two-phase alternator
2c Three-phase alternator
3 High voltage battery
10, 110, 210 Power supply filter
11a, 111a, 211a First terminal
11b, 111b, 211b Second terminal
11c, 111c, 211c Third terminal
11d, 111d, 211d Fourth terminal
11e, 211e Fifth terminal
11f, 211f Sixth terminal
211g Seven terminal
211h Eighth terminal
12a, 12b, 12c, 12d, 12e, 12f, 12g, 12h, 12i, 112a, 112b, 112c, 112d, 112e, 112f, 212a, 212b, 212c, 212d, 212e, 212f, 212g, 212h, 212i, 212j, 212k, 212l Line
13a, 13b, 13c, 13d, 13e, 13f, 113a, 113b, 113c, 113d, 213a, 213b, 213c, 213d, 213e, 213f, 213g, 213h Coil
13A, 13B, 213A, 213B Three-phase common-mode coil
113A, 113B Single-phase common-mode coil
14a, 14b, 14c, 114a, 114b, 214a, 214b, 214c X-capacitor
15a, 15b, 15c, 115a, 115b, 215a, 215b, 215c Y-capacitor
20a, 20b, 20c, 120a, 120b, 320a, 320b, 320c Power supply circuit
21 AC/DC converter
21a Electrolytic capacitor
21b Voltmeter
22 DC/DC converter
30, 30a Switching circuit
31a First terminal
31b Second terminal
31c Third terminal
32 Switching relay
33 Coil
34 Drive circuit
40 Inrush current prevention circuit
41a First terminal
41b Second terminal
42 Inrush current limiting circuit
43 Inrush prevention relay
44 Coil
45 Drive circuit
50 Control circuit

The invention claimed is:

1. A switched-mode power supply device provided with a plurality of power supply circuits that correspond to phases of a polyphase alternator, the switched-mode power supply device comprising:
 a switching circuit that allows switching of a phase connected to one of the plurality of power supply circuits not corresponding to a certain phase of the polyphase alternator, the switching being done between the certain phase and a phase to which the power supply circuit corresponds;

an inrush current prevention circuit that is disposed on a power supply line on a negative electrode side of the polyphase alternator and is disposed at a position closer to the polyphase alternator than a connection point at which the plurality of power supply circuits are connected to the polyphase alternator, the inrush current prevention circuit configured to prevent an inrush current;

a filter circuit disposed at a position closer to the polyphase alternator than the switching circuit and the inrush current prevention circuit are positioned relative to the polyphase alternator, the filter circuit being a circuit in which all lines for the phases are magnetically coupled to one another; and a control circuit that controls the switching circuit and the inrush current prevention circuit, wherein the control circuit allows initial charging of capacitors to be carried out while controlling the switching circuit such that the phase connected to the power supply circuit not corresponding to the certain phase is switched to the certain phase, and while causing the inrush current prevention circuit to function, the capacitors being capacitors that the plurality of power supply circuits respectively include, and when the initial charging is completed, controls the switching circuit such that the phase connected to the power supply circuit not corresponding to the certain phase is switched to the phase to which the power supply circuit corresponds, and stops the inrush current prevention circuit from functioning.

2. The switched-mode power supply device according to claim 1, wherein each of the plurality of power supply circuits includes:
an AC/DC converter that converts alternating current power into direct current power, and
a DC/DC converter that transforms the direct current power output from the AC/DC converter,
the AC/DC converter includes a capacitor and a voltmeter that measures a voltage of the capacitor, and
the control circuit determines, based on a voltage value measured by the voltmeter, whether or not the initial charging of the capacitor is completed.

3. The switched-mode power supply device according to claim 1, wherein the filter circuit includes:
a terminal on a positive electrode side, the terminal being disposed at a position closer to the polyphase alternator than the switching circuit positioned relative to the polyphase alternator and being connected to the switching circuit, and
a terminal on a negative electrode side, the terminal being disposed at a position closer to the polyphase alternator than the inrush current prevention circuit is positioned relative to the polyphase alternator and being connected to the inrush current prevention circuit.

4. The switched-mode power supply device according to claim 1, wherein the filter circuit is a filter circuit using a three-phase common-mode coil.

5. The switched-mode power supply device according to claim 4, wherein the three-phase common-mode coil composed of four windings wound on one core material.

6. The switched-mode power supply device according to claim 5, wherein the filter circuit includes a y-capacitor.

7. The switched-mode power supply device according to claim 6, wherein the filter circuit includes the two three-phase and the three y-capacitors.

* * * * *